United States Patent [19]

Horstmann

[11] Patent Number: 4,467,368
[45] Date of Patent: Aug. 21, 1984

[54] METHOD AND MEANS FOR RECORDING AND PLAYBACK OF COLOR TELEVISION SIGNALS

[75] Inventor: Winfried Horstmann, Griesheim, Fed. Rep. of Germany

[73] Assignee: Robert Bosch GmbH, Stuttgart, Fed. Rep. of Germany

[21] Appl. No.: 399,731

[22] Filed: Jul. 19, 1982

[30] Foreign Application Priority Data

Aug. 12, 1981 [DE] Fed. Rep. of Germany ....... 3131853
Apr. 5, 1982 [DE] Fed. Rep. of Germany ....... 3212665

[51] Int. Cl.³ .......................................... H04N 9/495
[52] U.S. Cl. .................................... 358/310; 358/334
[58] Field of Search ................. 358/310, 320, 12, 334, 358/134, 11

[56] References Cited

U.S. PATENT DOCUMENTS 4,335,393 6/1982 Pearson .................................. 358/12
4,376,957 3/1983 Dischert et al. .................... 358/310

Primary Examiner—John C. Martin
Assistant Examiner—Luan Nguyen
Attorney, Agent, or Firm—Frishauf, Holtz, Goodman & Woodward

[57] ABSTRACT

Time-expansion is provided to one-line segments of the luminance component of a color television signal, and time-compression is applied to one-line segments of the chrominance component, so that both components can be recorded on magnetic tape with optimum utilization of the bandwidth of recording channels utilized for both components. Time-compression and -expansion is provided by control of the independent write-in and read-out rates of charge coupled device stores. A commutation system is provided for applying the required clock rates in proper sequence to the various stores, and another commutation system is provided for stringing signal segments of television line lengths of the respective luminance and chrominance components, so that recording can be done in reel time in two channels on a magnetic tape. In one embodiment, the basic delay involved is reduced by reading in a component of one kind, while another component is being read out, and setting the clock rates, so that this operation can proceed at a single one of the clock rates.

19 Claims, 8 Drawing Figures

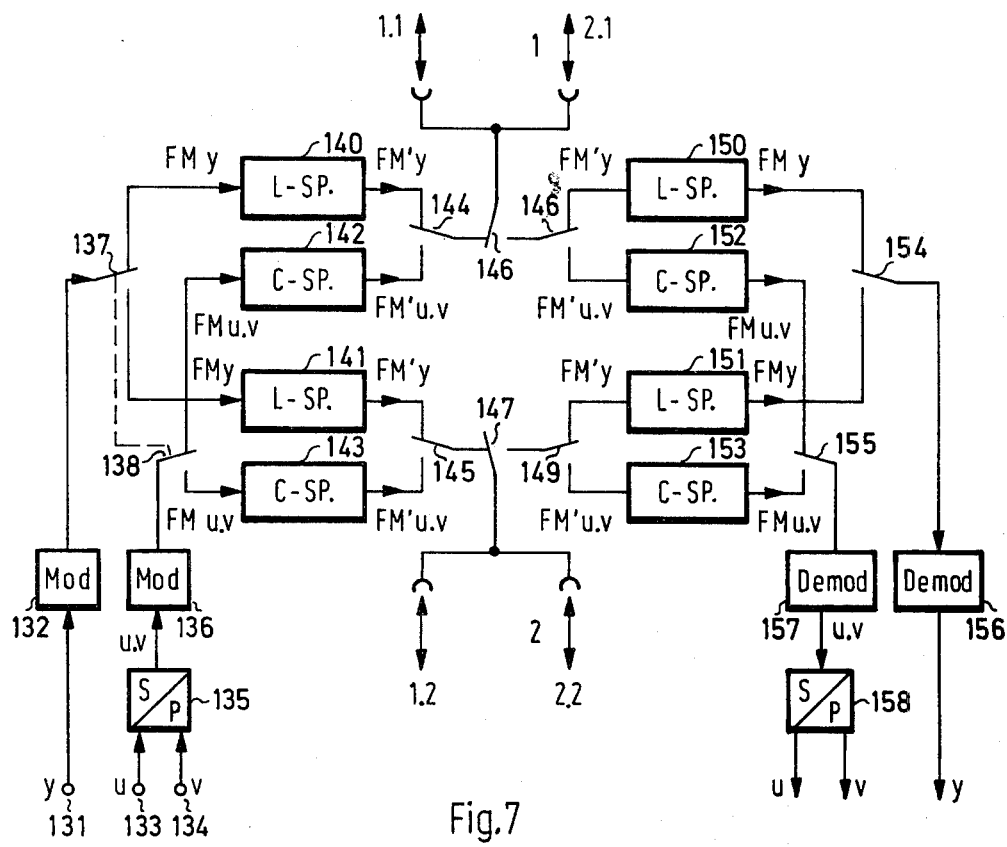
Fig.7
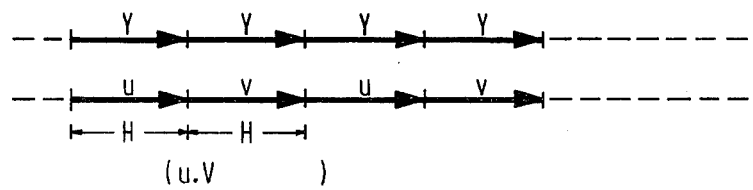
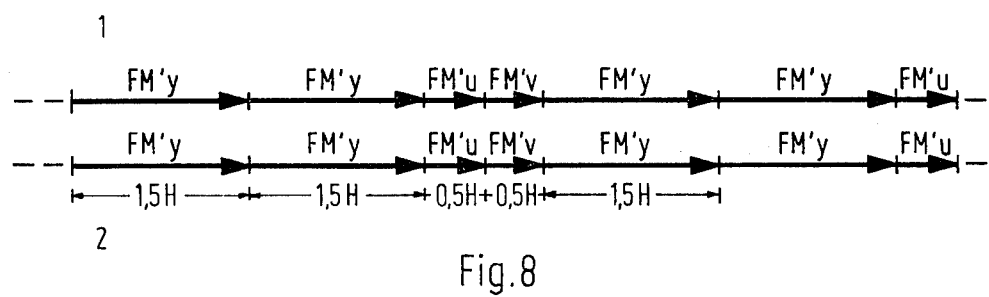
Fig.8

METHOD AND MEANS FOR RECORDING AND PLAYBACK OF COLOR TELEVISION SIGNALS

This invention concerns method and means for recording television signals utilizing time expansion and division into a plurality of channels for recording in a real time without requiring recording channels of bandwidth as great as that of the composite color television signal.

Continuing efforts for increasing the storage density for recording color television signals on magnetic tape has led to the introduction of a series of procedures, each of which has provided a certain conribution to attaining the higher storage density. The known procedures can be roughly subdivided into two categories. The first category of procedures for resolving difficulties concerns the increase of the useful frequency bandwidth of a particular type of magnetic tape equipment or the reduction of the necessary relative velocity between the magnetic record medium and the magnetic transducer heads, while maintaining the highest upper frequency limit for transission through the system. By reduction of the relevant dimensions for magnetic transducer heads and the improvement of the magnetic properties of the recording medium makes it possible up to a certain point to reduce the minimum recording wavelength still further, thus increasing the upper frequency limit for a given relative velocity of recording medium and transducer.

A further procedure for raising the storage density while maintaining the recording quality, and also at the same time maintaining low requirements on mechanical and electrical properties of the magnetic tape handling apparatus, is the process long used in the art of frequency conversion of a chrominance signal modulated in quadrature of an auxiliary carrier into a frequency band that lies adjacent to the lower frequency limit of the frequency modulated luminance signal. In application of the process there are still difficulties, however, as the result of the fact that in the recording of the frequency-converted auxiliary carrier at the necessary amplitude for obtaining a sufficient margin above noise, harmonics break into the frequency band of the luminance signal and lead to disturbance of the picture (color noise).

A second category of procedures for raising the storage density in the recording of signals on magnetic tape involves the subdivision of the color television signals into a luminance signal and a chrominance signal, followed by their separate recording in separate recording tracks on the tape. The system for so doing is so designed that the first and second kinds of signals are handled by separate recording magnetic heads in a manner in which the tracks of the first and second kinds partly overlap and, for reducing cross-talk, the core gaps of the respective magnetic heads for the first and second kinds of signals are set at an angle in the plane of the magnetic tape (azimuth recording).

For suppression of cross-talk occurring between individual tracks in the case of magnetic tape equipment dealing with television recording, in which the tape moves helically around a transducer apparatus in which a headwheel having two diammetrically opposite magnetic heads rotates, the synchronizing pulses of neighboring tracks are so disposed that they do not disturbingly influence the synchronization of the reproduced picture in playback. At the same time, a desirable simplification is provided in the case of time magnification or time compression. The relations to be observed in the disposition of the synchronizing pulses are further described in an article by F. T. Backers and J. H. Wissels, entitled "An Experimental Apparatus for Recording Television Signals on Magnetic Tape", in Philips Technical Review, Vol. 24, No. 3, 1962.

Another procedure is known for transmission and/or recording of color television signals in which the chrominance information is transmitted line-sequentially during the horizontal blanking interval in time-compressed form and/or recorded, with the intention of preserving a broadband luminance signal and making possible reliable synchronization. The luminance signal information is in such case transmitted during about 80% of the line period, and the chrominance information is transmitted time-compressed line-sequentially during the horizontal blanking interval of a standard color television signal. The chrominance signals are then transmitted or recorded during the remaining 20% of the line period. The known process offers an improvement in the resolution, and fewer color errors, because the amplitude errors arising in transmission or recording are noticeable merely as color saturation errors and not as color hue errors. Because of the sequential transmission of the color difference signals in single channel treatment, the known process is subject nevertheless to noticeable limitations with reference to the resolution in color reproduction.

Finally, it is known to reduce the bandwidth requirement in the recording of broadband signals by subdividing the signals in time division, one after the other, into n groups and to record them in two or more channels. In such cases, however, a dynamic store is involved with a number of parallel tracks in the longitudinal direction of the magnetic tape.

SUBJECT MATTER OF THE INVENTION

It is an object of the present invention to make a more efficient use of the information storage capacity of the recording medium by recording both the luminance and chrominance components of color television signals at approximately the same information density and to do this without undue complication and expense.

Briefly, the broadband signal component is time-expanded, and the chrominance signal component is time-compressed, each after being distributed into a plurality of channels respectively containing storage devices in which the ratio of the read-out rate to the write-in rate determines time-expansion or time-compression, as the case may be. Then, a time-expanded luminance signal taken out of one storage device and a time-compressed chrominance signal taken out of another storage device are fitted together sequentially for recording, in each case, in a separate channel, so that the signal is recorded in real time without cutting off any part of the signals present in the storage units. The reverse operation is done in playback to put together a continuous chrominance signal and a continuous luminance signal suitable for display on a picture tube.

The method and apparatus of the invention has the advantage of obtaining the desired uniformly high utilization of the storage capacity of the tape, since the signals are brought to approximately the same bandwidth by their respective time transformations. There is the further advantage that crosstalk between the individual recording channels is reduced.

It is of particularly advantage to record in the same channel the complete chrominance information of a line and the corresponding luminance information of the line, so that also in playback every television line is available completely in a continuous sequence.

In the case of very narrow band design of the transmission channels, it has been heretofore found useful to record the components of the composite color television signal separately in the form Y,U and V, where Y represents the luminance signal, U the B-Y color difference signal, and V the color difference signal R-Y. If the color difference signals U and V are sequentially transmitted, thus only in every second line for each case, and if the signal components are subjected to the prescribed time transformations and distribution among two or more channels, what then results is the recording of the color component U in one recording channel after the corresponding luminance signal Y of a line and the recording of the color component V of the next line in the immediate neighborhood of U in the neighboring track with the consequence of insufficient cross-talk damping. The method and apparatus of the invention, in contrast to what has just been described, has the advantage that, even in the case of the recording of the components of a color television signal with sequentially occurring chrominance components, in neighboring tracks of the tape the same kind of signal components are recorded, so that cross-talk between the individual recording channels is reduced. It is particularly advantage that after the termination in time of a recording sequence in each recording channel, there is available along with the luminance information, the complete chrominance information of this sequence.

BRIEF DESCRIPTION OF THE DRAWINGS

The invention is further described by way of illustrative example with reference to the annexed drawings, to which:

FIG. 5a and FIG. 5b are clock rate tables for FIG. 5;

FIG. 7 is a circuit block diagram of a third embodiment of recording and playback equipment according to the invention, and FIG. 8 is a time diagram for explanation of the time relations involved in signal processing by the circuit of FIG. 7.

DESCRIPTION OF THE ILLUSTRATED EMBODIMENTS

Figure 1:
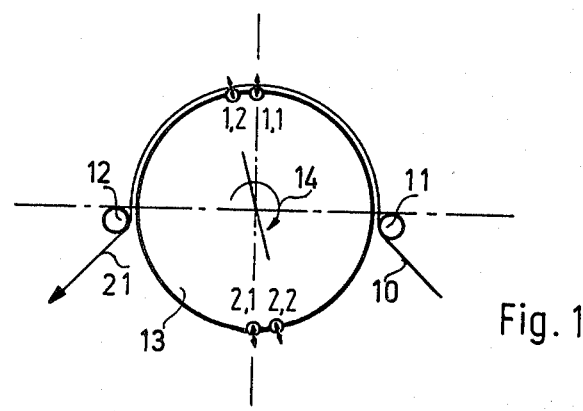
FIG. 1 is a schematic representation of a headwheel of a magnetic tape equipment for use in the system of the invention.

FIG. 1 shows a magnetic tape 10 guided around a headwheel 13 by means of rollers 11 and 12, so that the tape loops around the headwheel for about 180°. As the tape goes around the headwheel, it describes a half helix, so that the magnetic heads 1.1, 1.2, 2.1 and 2.2 disposed on the headwheel 13 and the magnetic tape 10 together describe a sequence of track sections running obliquely to the tape edge. The interrelations can be more closely examined with reference to FIG. 2. The heads 1.1 and 2.1 and likewise the heads 1.2 and 2.2 in each case provide a recording and/or playback channel, all these heads being disposed on the headwheel 13. The diammetrically disposed heads are thus electrically connected together in such a way that they in each case receive electric signals for recording on the magnetic tape simultaneously or are ready to pick up playback signals from the magnetic tape, and thereby deal with signals of the same kind.

Figure 2:
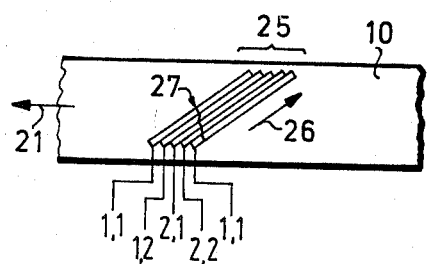
FIG. 2 is a diagram representing recording tracks on a tape recorded by a headwheel of the kind shown in FIG. 1.

The spatial arrangement of the magnetic heads on the headwheel 13 can be further explained with the aid of the track disposition shown in FIG. 2. The magnetic tape 10 in FIG. 2 is transported at a uniform velocity by known and therefore not further described drive means, in its longitudinal direction, e.g. in the direction of the arrow 21. The headwheel 13 with the magnetic heads fixed on its periphery rotates rapidly in the direction of the arrow 14, so that as the result of the pitch of the tape during the 180° envelopment, a sequence of magnetic tracks 25 are described on the magnetic tape 10. These tracks are designated in FIG. 2 with the reference numerals of the magnetic heads that produce them, and it can be seen that after every four tracks the recording sequence repeats. The direction of recording on the magnetic tape is shown by the arrow 26.

The magnetic head pairs 1.1,2.1 and 1.2,2.2 are offset on the headwheel 3 by a certain angle with respect to each other in the plane of the headwheel. The magnitude of the angular offset in the headwheel plane and the height offset perpendicular thereto results particularly from the desire to describe tracks on the magnetic tape 10, which utilize the storage space present on the tape as fully as possible. According to the choice of the circumferential speed of the headwheel, its diameter, the width of the tape and the transport velocity of the tape, the offset is so chosen that the individual tracks 25 always begin as close as possible to the tape edge and stop before the other tape edge is reached. Furthermore, recording of the tracks without safety spacing between the individual tracks is desired. In order to raise the recording density still further in order to suppress cross-talk between the individual track sections as much as possible, the arrangement is so provided in the illustrated example that the magnet heads of one recording channel have an orientation of the head gaps that is different from that of the heads for the other recording channel (FIG. 2). In consequence, in the case of inadvertent partial scanning of a track section by a magnetic head not intended for that track, a heavy damping of the signals from the adjacent track arises because of the angular deviation of the gap. This effect is known in the art as azimuth damping.

For further suppression of cross-talk disturbance from one track section to the neighboring section, thus from one channel to the other, the track arrangement can be so constituted that, as shown at 27 in FIG. 2, the synchronizing signal portions, which are characterized by large amplitude values and are of the same frequencies, always lie adjacent to each other.

Figure 3:
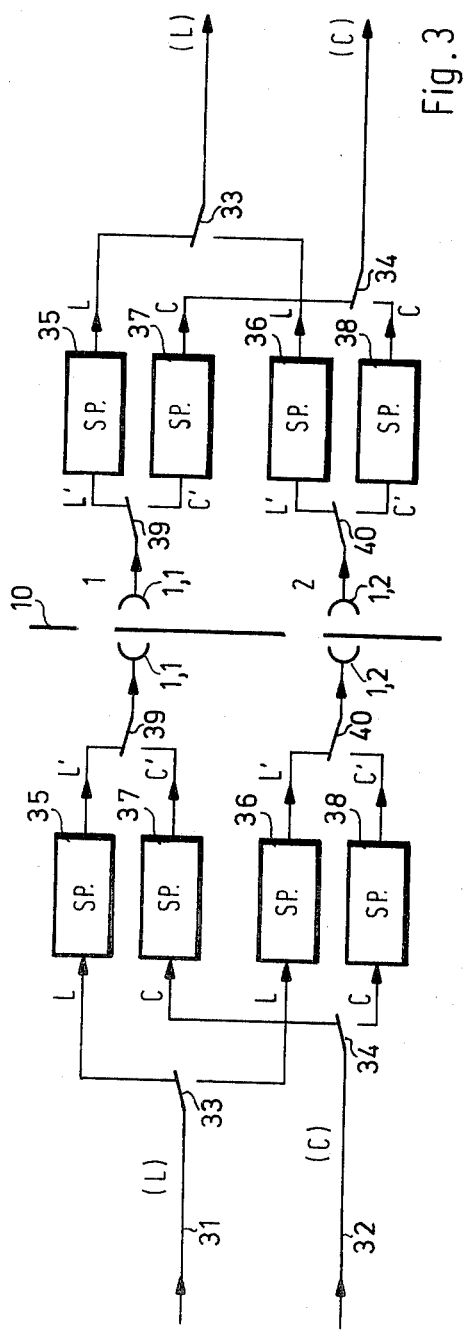
FIG. 3 is a circuit block diagram of recording and playback according to a first embodiment of the invention.

In the schematic representation of a recording and reproducing system according to the invention given in FIG. 3, the composite television signal for recording is first subdivided, by means of a filter not shown in the drawing, into a luminance component L and a chrominance component C, which are then respectively supplied to the inputs 31 and 32. The luminance signal L at the input 31 and the chrominance signal C at the input 32 are then each alternately switched, respecttively by the switches 33 and 34, between a pair of signal storage units 35,36; 37,38. The outputs of the storage units 35 and 37 then go to the fixed contacts of an alternating switch 39, while the outputs of the storage units 36 and 38 go to the fixed contacts of a similar alternating switch 40. The arm (movable contact) of the switch 39 is connected to the signal winding of a first magnetic head 1.1 and likewise the arm of the alternating switch 40 with the signal winding of a second magnetic head 1.2. The magnetic heads 1.1 and 1.2 are operatively adjacent to the surface of the magnetic tape 41 for magnetically storing in the tape the electric signals provided to the signal windings.

In an analogous manner, as shown in the righthand half of FIG. 3, the magnetically operative parts of the magnetic heads 1.1 and 1.2, in playback operation, pick up the signals stored (invisibly) in tracks on the tape. At the conversion into electric signals in the respective windings of the magnetic heads, these stored signals are distributed alternately to the storage units by the switches 39,40, so that the signals from the magnetic head 1.1 go alternately over the switch 39 to the storage units 35 and 37, and those from the magnetic head 1.2 likewise over the switch 40 to the storage units 36 and 37. The outputs of the storage units 35 and 36 are alternately picked up by the switch 33 to produce at its movable pole a consistent luminance signal L, while the outputs of the storage units 37 and 38 are alternately picked up by the switch 34 to produce at its movable pole a consistent chrominance signal C.

The storage devices 35,36,37 and 38 are advantageously constituted as storage devices having write-in and read-out clock rates that are independent of each other, in order to obtain a simple circuit configuration. Furthermore, in the illustrated example these storage units are constituted so as to store the information content of an entire television line. Stored units for this purpose can, for example, be of the charge coupled device (CCD) type.

In operation, the luminance signal L filtered out from the standard composite television signal is alternately switched from the input 31 to the respective storage units 35 and 36 by means of the alternating switch 33 at a switching frequency which is at the half value of the line scanning frequency of the standard color television signal which is to be recorded. In consequence, after every writing in of a line of the luminance component L into the store 35, the luminance information of the next line is written into the store 36, and so on. At the same time and at the same switching frequency, the switch 34 operates by which the chrominance component C is alternately switched from the input 32 to the two stores 37 and 38.

For reading out the one line long signal segments contained in the stores 35 and 36 with the luminance information therein contained, a clock rate is selected which is smaller by the factor 1.5 than the rate used for writing these in. In consequence, the period required for the read-out operation is longer by the factor 1.5 and the individual signal segments are therefore expanded in time compared to the writing in.

For reading out the one-line long signal segments cotained in the stores 37 and 38 with the information content of the chrominance signal, a clock rate is selected which is larger by the factor 2 than that used for writing in. In consequence, the read-out in this case lasts only half as long as the time used for writing in, and the individual signal segments are thus compressed in time.

By means of the changeover switch 39, the respective segments of the time-expanded luminance signals, now designated L', stretched by the factor 1.5 compared to their original length, and of the time-compressed chrominance signals, now designated C', shrunk to half of their original length, are alternately supplied to the signal winding of the magnet head 1.1 and stored on the magnetic tape on the same set of track segments. In this same way, by the switch 40, the time-expanded signal components L' taken from the store 36 and the time-compressed signal components C' read out of the store 38, are put together and stored in a second set of tracks segments on the magnetic tape 41 by the magnetic head 1.2.

The respective factors for time-expansion and compression in the illustrative embodiment described above are arbitrarily chosen. They result, however, from the assumption that the respective bandwidth requirements for the luminance signal L and the chrominance signal C are approximately in the ratio of 3:1. Thus, if there were no change of the time base, the storage of the luminance information L would require a recording channel having three times the bandwidth compared to the recording channel for the chrominance signal C, so that if both recording channels are of the same design, the channel occupied by the chrominance signal C is only used at one-third capacity. By the time-expansion of the signal segments having the luminance information L, the bandwidth requirement for their recording goes down, for example, from 3 to 2 MHz, while with the compression of the signal segments with the chrominance signal C, the bandwitdh requirement goes up from the previous value of about 1 MHz likewise to 2 MHz. In consequence, a recording channel designed for 2 MHz bandwidth is optimally utilized both in the storage of the luminance component L and in the storage of the chrominance component C.

As already indicated, FIG. 3 shows only the circuit elements necessary for explaining the basic manner of operation. There have been accordingly left out, in the schematic representation, signal processing circuits such as amplifiers and limiters, provided in conventional circuit technology and likewise the clock rate generating circuits necessary for controlling the switches 33, 34,39 and 40. Their constitution and manner of operation, however, are well within the scope of knowledge and capability of the average person skilled in magnetic recording art, so that the explicit representation of such details can here be dispensed with.

Figure 4:
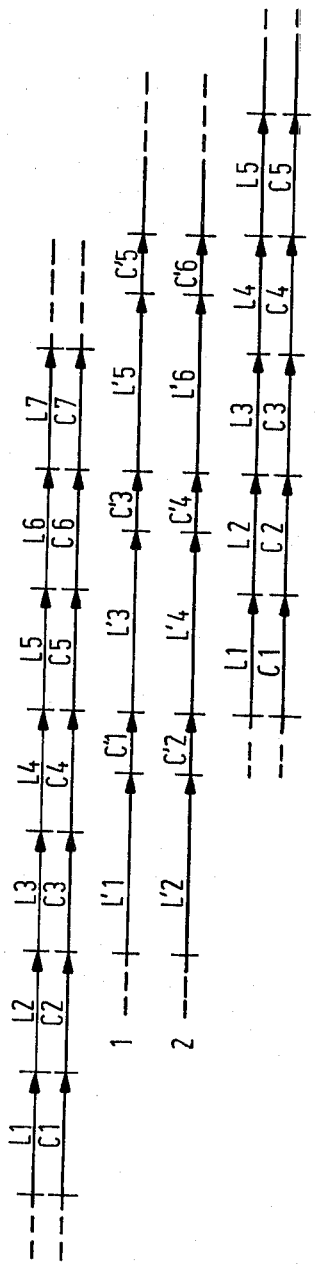
FIG. 4 is a time diagram for explanation of the time relations in signal processing in the circuits of FIG. 3.

In the signal segment timing diagram given in FIG. 4, the line-length signal segments supplied to the inputs 31 and 32 are designated L1,L2,L3, . . . and C1,C2,C3, . . . . After the signals L1,L2,L3, and so on have passed through the stores 35 and 36 and the signals C1,C2,C3 and so on have passed through the stores 37 and 38, and have then been commutated by the switch 39 and 40, as already described, and supplied to the signal windings of the magnetic heads 1.1 and 1.2, there results a two-channel signal flow of the form shown on the second and third lines of FIG. 4, where in channel 1 the luminance and chrominance signal segments with uneven index numbers are found, and in channel 2 those with even index numbers, while all the signal segments L having the luminance information are time-expanded for the purpose of bandwidth reduction, and the signal segments with the chrominance information are time-compressed to obtain higher storage density, while each channel contains both compressed and expanded segments, so that the signal flow in each case can progress with complete transmission in real time.

The arrangement of the tracks on the magnetic tape is advantageously so provided that in neighboring tracks the boundaries between the signal segments are located opposite each other and in these neighboring tracks, similar information will be stored on each side of the boundary, thus reducing the disadvantageous cross-talk possibilities.

In reproduction, the signal segments recorded in the two parallel channels are restored to their original lengths by means of suitable clock control of the stores 35 to 38 and the commutation switch system 33,34,39 and 40, so that two continuously flowing signal trains L1,L2,L3 . . . and C1,C2, C3 . . . are respectively put together. As a result of the time transformation provided in the stores 35 to 38, a basic delay is produced, shown by the offset in the last two lines of FIG. 4 with respect to the first two lines of FIG. 4, that is to be taken account of in the determination of the recording pattern on the magnetic tape.

Figure 5:
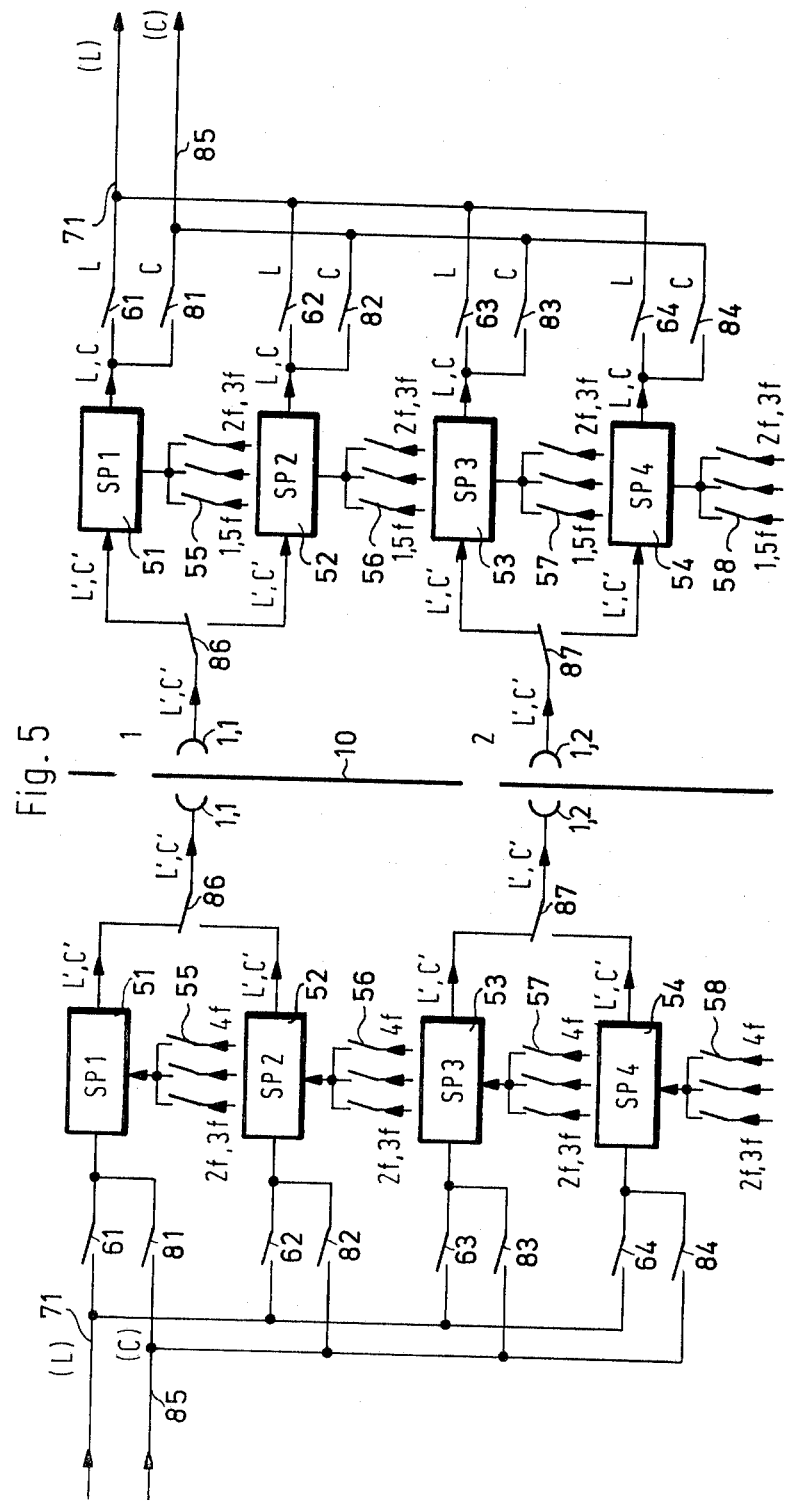
FIG. 5 is a circuit block diagram of a second embodiment of recording and playback equipment according to the invention.

In the embodiment illustrated in FIG. 5, the charge coupled device (CCD) stores 51,52,53 and 54, are controlled at clock rates differently related than in the previously described embodiment. The clock inputs of the stores are connected by commutation switches 55,56,57 and 58 with clock pulse sources of which the clock rates are in the proportion 2:3:4. The inputs of the stores 51 to 54 are respectively connected to the lines 71 which supplies the luminance information through the switches 61,62,63 and 64, and also in parallel thereto to the line 85 which supplies the chrominance information through the switches 81,82,83 and 84. The outputs of the stores 51 to 54 are connected in pairs respectively through the switches 86 and 87, through the signal windings of the magnetic heads 1.1 and 1.2.

In reproduction, the inputs and outputs of the stores 51 to 54 are mutually interchanged in each case, and the clock control to the clock inputs is provided by clock pulse sources having clocking rates in the ratio of 1.5:2:3. In other respects, the reproduction system is strictly in mirror symmetry, with respect to the recording system, so that individual components do not need to be further explained here. The clock rates for recording and playback are tabulated in FIGS. 5a and 5b.

The manner of operation of the recording and reproduction system of FIG. 5 is best explained in connection with the signal segment timing diagram of FIG. 6.

The signal segments entering from the lines 71 and 85, each of one line length, providing luminance information from line 71 and chrominance information from line 85, are connected to the inputs of the stores 51 to 54 through the commutation system composed of the switches 61-64 and 81-84. As shown in the top two lines of FIG. 6, the luminance signal L and the chrominance signal C, as originally provided, are in separate channels with the line segments following each other. When the switch 61 is closed for the duration of a television line, the luminance information of this one line is read into the store 51 in the first time interval shown in FIG. 6, while at the same time the clock rate switch 55 connects the clock input of the store 51 to the line designated 3f selecting the middle clock rate from the clock rates available in the 2:3:4 proportion. When the writing of the luminance information L1 into the store 51 is completed, the clock input of the store 51 is connected with the clock pulse source that delivers a clock rate lower by a factor of 0.66. At the same time, the commutation switch 86 is so actuated that the output of the store 51 is connected with the magnetic head 1.1. The reading out of the luminance information from one television line in the store 51 now requires, at the lower clock rate, 1.5 the amount of time, i.e., the time base is stretched and the bandwidth requirement for storage reduced.

As can be seen from the clock rate table provided in FIG. 5a, the writing-in of the chrominance information for every line occurs at the same rate that the reading-out of the luminance information from the store takes place. By the use of the shift register principle, it is therefore possible to write in different information in the store simultaneously with the read-out, so long as these operations take place at the same clock rate. Consequently, it is possible by closing the switch 81 and opening the switch 61, to write the chrominance information C into the store 51 at the same time that the luminance information L'1 is read out of this store in the time segment shown for that operation on the third line of FIG. 6. During that period, not only all of the segment C2, but a part of the segment C3 (see second line of FIG. 6b) is written along into the store, but this circumstance is harmless, because in the following read-out, the output of excessive information is suppressed by corresponding commutation of the clock input. In a corresponding manner, the signal segment pairs L'2/C'3, L'3/C'4, L'4/C'5 . . . are obtained from the signal trains L2,L3,L4 . . . and C3,C4,C5 . . . according to the time scheme illustrated in the third to sixth lines of FIG. 6, and then, as shown in the seventh and eighth lines, put together by corresponding commutation of the switches 86 and 87 into two continuous signal trains with the same bandwidth requirements for luminance and chrominance information. These two signal sequences are then respectively recorded on the tape 10 by the two magnetic heads 1.1 and 1.2. The reproduction operation follows with a reciprocal time transformation of the signal segments stored on the tape 10. This is obtained by corresponding clock rate control of the stores 51 to 54. Thus in the time slots designated on the seventh line of FIG. 6 for channel 1, first, the signal segment L'1 with luminance information is written into the store 51 after the store 86 has connected the store input with the signal winding of the magnetic head 1.1. The write-in clock rate is then 2f, exactly the magnitude of the read-out clock rate in the recording operation. When all the information L'1 is contained in the store 51, the clock input of the latter is connected to the clock pulse source having the clock rate 3f, so that the following read-out operation takes place at 1.5 times the speed of the writing-in.

Figure 6:
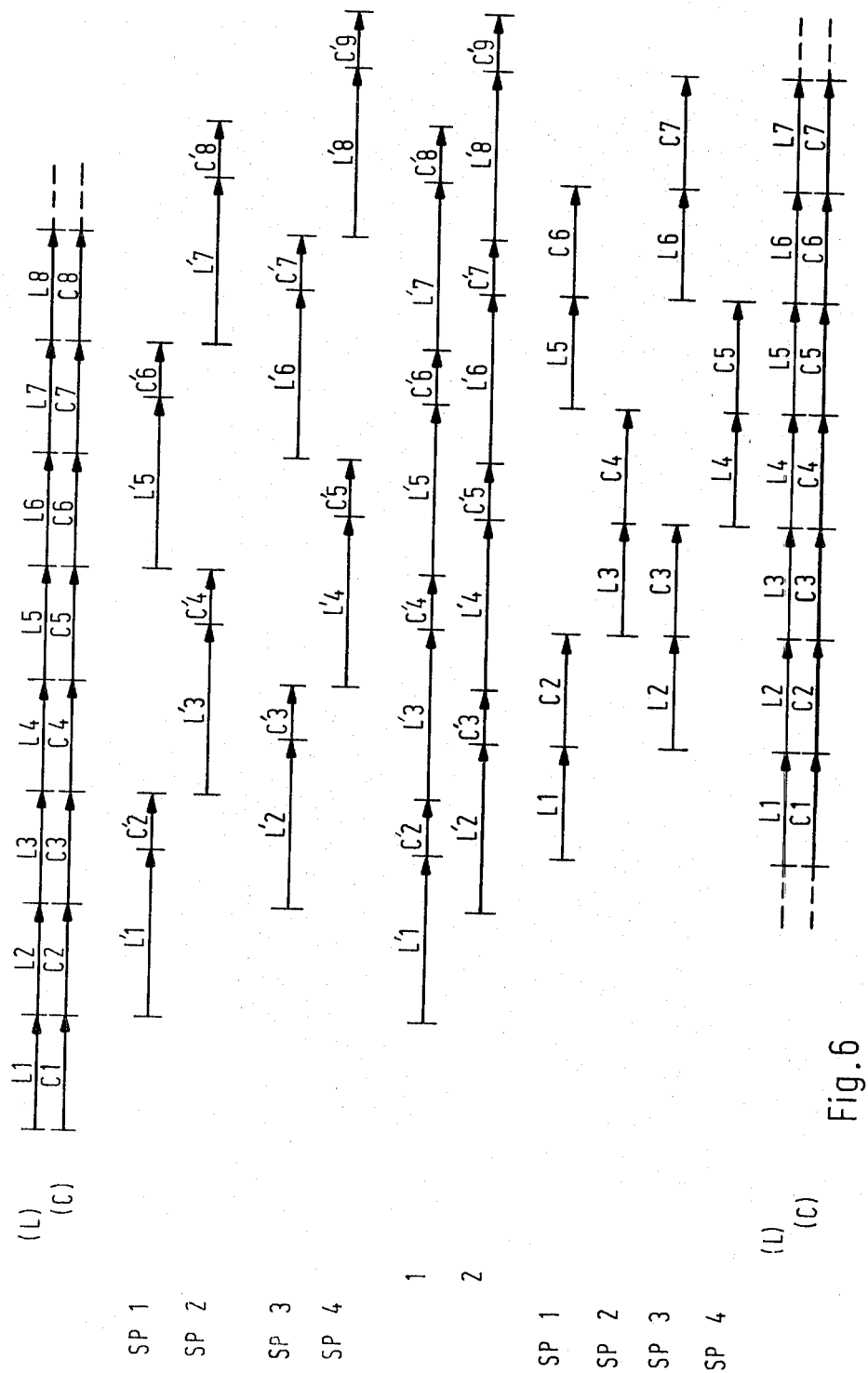
FIG. 6 is a time diagram for explanation of the time relations in signal processing in the circuit of FIG. 5.

This signal segment therefore appears at the output of the store 51 in its original length L1, as shown on the ninth line of FIG. 6. At the same time as the read-out of the luminance information, the chrominance information C'2 that follows in the same track on the magnetic tape is written into the store at the same rate. Immediately thereafter, the clock input of the store 51 is switched over again, and the chrominance information contained therein is read out at a rate reduced by half compared to the write-in rate, so that it is brought back to the original length C2, as also shown on the ninth line of FIG. 6. By corresponding commutation of the switches 61 and 81, the signal segments sequentially appearing at the output of the store 51 with alternating luminance and chrominance information are distributed to the lines 71 and 85 in such a way that the line 71 contains the continuously running luminance information, and the line 85 the continuously running chrominance information. For this purpose, the stores 52 to 54 are also connectible in the same way in parallel to the line 71 and 85. After the bringing together of the signal segments L1/C2, L2/C3, L3/C4 . . . (ninth to fourteeth lines of FIG. 6) into the two signal sequences respectively containing the luminance information (L1,L2,L3, . . . ) and the chrominance information (C1,C2,C3, . . . ) (last line of FIG. 6), the storage operation is terminated.

The schematic diagram given in FIG. 7 to illustrate the practice of the invention shows color television components Y,U and V prepared for recording in accordance with the invention. In this case, the luminance signal Y is supplied to the input 131 of a modulator 132, where it is bandwidth limited and modulated on a carrier frequency. The color difference signal U is supplied to a first input 133, and the contemporaneously provided second color difference signal V to a second input 134 of a parallel-to-series converter 135. In the operation of the latter, the color information signals U and V are alternately suppressed, so that the output of the parallel-to-series converter, the two color difference signals are serially obtainable. In the modulator 136, this serial signal sequence is modulated onto a second carrier frequency having a substantially lower frequency value compared to the carrier frequency for the luminance signal. The signal components now provided with their respective carriers are then alternately provided to the stores 140,141 and 142,143 by the switches 137 and 138, which have a switching frequency at $\frac{1}{4}$ of the line frequency. The outputs of the stores 140 and 142 are commutated by a switch 144, while the outputs of the stores 141 and 143 are switched by a commutation switch 145 of the same type. The arm of the switch 144 is connected during recording through the arm 146 of the recording/playback selector switch, the signal windings of the magnetic heads 1.1 and 2.1 belonging to the same recording channel. In the same way, the arm of the switch 145 is connected through the arm 147 of the recording/playback selector switch with the signal windings of the magnetic heads 1.2 and 2.2 belonging to the second recording channel. The magnetic transducers 1.1., 1.2, 2.1 and 2.2 are set in operative relation to the surface of the magnetic tape 10 for magnetic storage of the electrical signals respectively provided to them.

In an analogous manner, as shown in the righthand half of FIG. 7, the magnetically operative portions of the magnetic transducers 1.1,1.2,2.1 and 2.2 pick up in playback operation the signals stored in (invisible) tracks on the tape. After conversion into electrical signals in the windings of the respective magnetic heads, these electrical signals are transferred by the switch arms 146 and 147 (which in playback operation are in their other positions, not shown in the drawings) through the commutation switches 148 and 149 alternately into the stores 150,151,152 and 153. The signals delivered alternately by the magnetic heads 1.1 and 2.1 of the first recording channel thereby reach the stores 150 and 152, and those from the magnetic heads 1.2 and 2.2 of the second recording channel reach the stores 151 and 153. The outputs of the stores 150 and 151 are connected to the contacts alternately connected by the switch 154 to the demodulator 156, and the outputs of the stores 152 and 153 likewise to the contacts connected alternately by the switch 155 to the demodulator 157. The luminance signal in modulated carrier form $FM_Y$ is demodulated in the circuit 156 to provide the luminance signal Y. In the demodulator 157, the alternately available modulated carrier signals $FM_U$ and $FM_V$ are demodulated to provide the color difference signals U and V in serial form. Afer serial-to-parallel conversion in the serial-to-parallel converter 158, both of the color difference signals U and V are simultaneously available on separate circuits.

In order to obtain a simple circuit configuration for the stores 140 to 143 and 150 to 153, storage devices are advantageously chosen which have independent write-in and read-out clock rates, for examples stores of the CCD type. Furthermore, the stores, as in the here illustrated case, can store the information content of two entire television lines.

The manner of operation of the recording and playback system of FIG. 7 is best explained in connection with the signal segment time diagram of FIG. 8.

The luminance component Y of the composite color television signal is, as already described, modulated onto a carrier frequency in the modulator 132, and the chrominance components U and V are first converted from parallel into serial form in the converter 135 and then modulated onto a second carrier frequency in the modulator 136. In these operations the carrier frequency for the broadband luminance signal Y can, for example, by at 4 MHz and the carrier frequency for the serially provided chrominance components U and V at 1.5 MHz. The luminance signal $FM_Y$ thus prepared at the output of the modulator 132 is alternately switched into the stores 140 and 141 by the switch 137, which operates at one-fourth of the line frequency of the standard color television signal which is to be recorded. In consequence, the luminance component Y of two successive lines is stored in each switch cycle in the store 140, and that of the next two following lines in the store 141, and so on. At the same time and at the same switching frequency, the switch 138 operates to distribute the serially available processed chrominance components $FM_U$ and $FM_V$ respectively to the stores 142 and 143. For the reading-out of the signal segments having the luminance information of a single line length contained in the stores 140 and 141, a clock rate is chosen which is smaller by the factor 1.5 than the write-in rate that was used. In consequence, the duration of the read-out operation is longer by the factor 1.5, so that the individual signal segments $FM_Y$ are expanded in time. For the read-out of the signal segments of line length providing the color difference signal information content from the stores 142 and 143, a clock rate is chosen that is greater by the factor 2 than that used for write-in. In consequence, the read-out operation lasts for only half the time used for write-in, and the individual signal segments are therefore time-compressed.

The switch 144 at the output of the stores 140 and 142 operates to provide to the signal windings of the magnetic heads 1.1 and 2.1 alternately the luminance signals from the store 140, which are time-expanded by the factor 1.5 compared to the original length, designated $FM_Y$ and the segments of the color difference signals from the store 142, time-compressed to half the original length in alternation and designated $FM'_U$ and $FM'_V$. In the same way, the switch 145 operates to provide to the heads 1.2 and 2.2 the time-expanded signal segments FM'$_Y$ from the store 141 and color difference signal components FM'$_U$ and FM'$_V$ read out of the store 143 for recording in a continuous sequence on the tape 10 in another set of track sections belonging to a second recording channel.

The factors for time-compression and -expansion of the embodiment just described are again chosen arbitrarily. They advantageously again result from the assumption that the bandwidth requirement for the luminance signal Y is substantially in the ratio of 3:1 to the bandwidth requirement for each color difference signal. By time-expansion of the signal segments providing the luminance components Y the bandwidth requirement for their recording goes down in the illustrated example from 4 MHz to 2.66 MHz, while with the compression of the signal segments containing the color difference signal FM$_U$ and FM$_V$, the bandwidth requirement is raised from the previously required value of about 1.5 MHz to the same 2.66 MHz. In consequence, a recording channel designed for a 2.66 MHz bandwidth is optimally utilized, both in the recording of the frequency modulated version of the time-expanded luminance signal Y and for the serially provided frequency modulated versions of the color difference signals U and V.

As already mentioned, FIG. 7 shows only the circuit elements necessary for explaining the basic manner of operation. There are omitted, accordingly, in the schematic representation the signal processing circuits present in conventional technology, such as amplifiers, limiters, and the like, and also the necessary the clock pulse generating circuits for control of the switches 137,138,144 and 145. Their constitution and manner of operation, however, lies well within the scope of the knowledge and capability of the average person skilled in the art of magnetic recording, so that an explicit representation of such circuits can be dispensed with here.

FIG. 8 is a signal segment timing diagram for the circuit of FIG. 7. The signal segments providing the luminance components present at the input 131 of FIG. 7 are designated Y and those at the input 133 providing respectively the color difference signals B-Y and R-Y are respectively designated U and V. After the parallel-to-series conversion, the color difference signals U and V are alternately provided to the inputs of the modulator 136. The length of a standard television signal line is designated H. The signal segments with the luminance component Y are stretched by the factor 1.5 in the stores 140 and 141, so that two lines of the carrier version FM'$_Y$ of the luminance signal are recorded by the two magnetic heads 1.1 and 2.1 before the switch 144 connects the store 142 with the two one-line magnetic heads just mentioned, whereupon the two time-compressed carrier version color difference signal segments FM'$_U$ and FM'$_V$ are recorded directly following the two signal segments of the luminance component. With these operations, one sequence is completed for channel 1. In the same way in the second channel, two signal segments with the luminance component and immediately thereafter the corresponding time-compressed signal segments with the color difference signals are sequentially recorded. In consequence, there results a two-channel signal flow shown in the bottom two lines of FIG. 8, which if provided with indices designating the successive lines, would show in channel 1, for example, the luminance component signal segments with the indices 1 and 2 followed by the two signal segments with the corresponding two color difference signals, then, omitting the signal segments with the indices 3 and 4, followed by the luminance component signals with the indices 5 and 6, followed by the color difference signals with the indices 5 and 6, and so on. In a similar way, channel 2 contains the signal components with the indices 3,4,7,8 and so on.

According to another illustrative embodiment, the carrier frequency of the luminance signal Y is at 4.5 MHz and the carrier frequency for the serially provided color difference signals at 1.5 MHz. After reduction of the bandwidth for the recording of the Y signal to 3 MHz and reducing by half the recording length for the color difference signals, which corresponds to a doubling of the bandwidth requirement from 1.5 MHz to 3 MHz, the two signal portions can be recorded continuously in one channel with the same bandwidth requirement for each.

The arrangement of the tracks on the magnetic tape is advantageously so provided that in neighboring tracks signal sections with similar picture content are adjacent to each other, so that the spoiling effect of cross-talk is reduced. Thus, the signal segments with the luminance component and the indices 1 and 2 will then lie alongside the luminance components with the indices 3 and 4, and likewise the following signal segments with the color difference signals and the indices 1 and 2 alongside the color difference signals with the indices 3 and 4. In this arrangement, a signal segment with the content of the color difference signal U of the first line lies alongside the signal segment with the color difference U of the third line. Likewise a signal segment with the color difference V of the second line lies alongside the signal segment V of the fourth line. In playback, the signal segments recorded in the two parallel channels can be brought back to their original lengths with suitable clock control of the stores 150,151 and 152,153 and put together into two continuous signal segment sequences Y,Y,Y, ... and U,V,U,V ... respectively. As a result of the time transformation in the stores, there appears upon reproduction a basic delay which is to be taken into account in the recording pattern on the magnetic tape.

Although the invention has been described with reference to particular illustrative examples, it will be recognized that other variations and modifications are possible within the inventive concept.

I claim:

1. Method of recording color television signals comprising the steps of:

separating the luminance and chrominance components of the color television signal from each other;

distributing the luminance and chrominance signal components each into a plurality of channels, the same number of channels in each case;

time expanding the luminance signal component in each of the channels in which it is distributed;

time compressing the chrominance signal component in each of the channels in which it is distributed;

combining on a time sharing basis the luminance signal component from each of the channels in which it is distributed with the chrominance signal component from a different one, in each case, of the channels in which the chrominance signal component is distributed, and recording each channel combination of signal components thus obtained in a separate recording channel, the time expansion ratio of the time expansion step and the time compression ratio of the time compression step being coordinated so as to avoid shutting out any part of either signal component in the combination step, while substantially equalizing the ratio of the information density of the recording of the respective signal components with respect to the capacity of the record medium for information density.

2. Method of reproducing color television signals recorded with a substantially equalized ratio of the information density of the recording of the luminance and chrominance signal components with respect to the capacity of the record medium for information density, in which a plurality of channels are recorded, each containing different parts of the luminance and chrominance components, said method comprising the steps of:
  picking up the separately recorded channels in separate pick-up circuits;
  separating in each pick-up channel the luminance signal component from the chrominance signal component;
  time compressing the luminance signal component separated from each of said pick-up channels;
  time expanding the chrominance signal component separated from each of said pick-up channels;
  combining together the time compressed luminance signal component of all pick-up channels, and
  combining together the time expanded chrominance signal component of all of said pick-up channels,
  the time compression ratio of the time compression step and the time expansion ratio of the time expansion step being such as to reconstitute the bit rates and frequency spectra of the respective components to those of a normal television signal suitable for display on a screen.

3. Method as defined in claim 1, in which said color television signal is a digital signal, and in which the time expansion and time compression steps are performed by storage in storage units having different read-in and write-out rates.

4. Method as defined in claim 2, in which the recorded signals are digital signals, and in which the time expansion and time compression steps are performed by storage in storage units having different read-in and write-out rates.

5. Method as defined in claim 1, in which said luminance signal components are present in the form of a luminance signal Y modulated on a first carrier frequency, and in which said chrominance signal components are in the form of color difference signals U and V, which in the recording stage are first converted from parallel form to serial form, and then are modulated on a second carrier frequency.

6. Method as defined in claim 2, in which said signal components are recorded in the form of signals modulated on a first carrier frequency in the case of the luminance signal component, and on a second carrier frequency in the case of said chrominance signal component, and in which said modulated signals are demodulated.

7. Method as defined in claim 5, in which the ratio of said first to said second carrier frequency is 3:1.

8. Method as defined in claim 6, in which the ratio of said first to said second carrier frequency is 3:1.

9. Method as defined in claim 5, in which said time expansion ratio is a ratio of 1.5:1, and said time compression ratio is a ratio of 1:2.

10. Method as defined in claim 6, in which said time compression rate is a ratio of 1.5:1, and said time compression ration is a ratio of 1:2.

11. Method as defined in claim 1, in which the recording step is performed by recording the several recording channels in adjacent parallel tracks in a manner in which simultaneously recorded signal segments are provided with recording of signals of the same kind.

12. Method as defined in claim 6, in which the recording of the several channels in adjacent tracks is performed so that signal segments having the content of the color difference signal U and signal segments having the content of the color difference signal V are in each case recorded in side-by-side adjacent channels.

13. Method as defined in claim 3, in which the read-out rate of time-expanded luminance signal component is the same as the write-in rate of said chrominance signal components, and in which the distribution of said luminance and chrominance components to said channels follows the pattern of writing in a luminance component segment followed by a chrominance component segment, in each case on a staggered time pattern among the storage units used for time expansion and compression, and in which the same storage units are used for expanding the luminance component segment and compressing the chrominance component segment, the write-in rate of said luminance component signal being 50% greater than its read-out rate, and the read-out rate of said chrominance component signal being twice as great as its write-in rate.

14. Apparatus for recording color television digital signals, comprising:
  means for providing separate luminance and chrominance digital signal components of the color television signal;
  first switching means for distributing said luminance and chrominance signal components each into a plurality of channels, the same number of channels in each case;
  storage means in each of said channels equipped with read-out means operable at a different rate from the input signal rate for time expanding the digital signals in the case of the channels containing said luminance signal component and for time compressing the digital signals in the case of the channels containing the chrominance signal component;
  second switching means for combining on a time-sharing basis the luminance signal component from each said channel in which it was distributed by said first switching means with the signals of the chrominance signal component in one of the channels, a different one in each case, in which signals of said chrominance signal component were distributed by said first switching means, the time expansion and compression ratios provided by said storage means being coordinated so as to avoid shutting out any part of either signal component in the combining operation of said second switching means, while substantially equalizing the ratio of information density of the luminance and chrominance portions of the respective combined signals, and
  means for recording in a separate recording channel each combination of a distributed portion of said luminance signal component with a distributed portion of said chrominance signal component contemporaneously provided by said second switching means.

15. Apparatus for reproducing color television digital signals recorded with a substantially equalized ratio of the information density of the recording of the luminance and chrominance signal components with respect to the capacity of the record medium for information density, said color television digital signals being recorded in a plurality of channels each containing different parts of the luminance and chrominance components, said apparatus comprising:
- a plurality of signal pickup means for picking up in the form of electrical signals the signals respectively recorded in said separate recording channels recorded on a record medium;
- means for separating in each pickup channel the luminance signal component portion of the picked up signal from the chrominance signal component of the picked up signal;
- storage means for said luminance signal component and for said chrominance signal component picked up in each of said pickup channels, said storage means having associated read-out means operating at a rate different from the signal input rate to said storage means, the read-out means in each case being operable for time compressing the picked up luminance signal component and time expanding the picked up chrominance signal component;
- first switching means for combining together the time-compressed luminance signal component of all pickup channels, and
- second switching means for combining together the time-expanded chrominance signal component of all pickup channels,
- said read-out means of said storage means being constituted to provide a time compression ratio for luminance signal components and a time expansion ratio for chrominance signal components such as to reconstitute the bit rates and frequency spectra of the respective components to those of a normal television signal suitable for display on a screen.

16. Apparatus as defined in claim 14 in which said read-out means of said storage means are provided by an array of timing signal sources connected with the read-out clocking inputs of said storage means, said array of timing signal sources also providing clocking means for writing digital signals into said respective storage means.

17. Apparatus as defined in claim 15, in which said read-out means of said storage means are provided by an array of timing signal sources connected with the read-out clocking inputs of said storage means, said array of timing signal sources also providing clocking means for writing digital signals into said respective storage means.

18. Apparatus as defined in claim 16 in which the ratio of clocking rates for time expansion, write-in and time compression is 2:3:4.

19. Apparatus as defined in claim 17 in which the ratio of clocking rates for time expansion, write-in and time compression is 1.5:2:3.

* * * * *